United States Patent [19]

Parris

[11] 4,337,920

[45] Jul. 6, 1982

[54] VALVE

[75] Inventor: Joe P. Parris, Magnolia, Tex.

[73] Assignee: Cameron Iron Works, Inc., Houston, Tex.

[21] Appl. No.: 197,409

[22] Filed: Oct. 16, 1980

[51] Int. Cl.³ .............................................. F16K 1/00
[52] U.S. Cl. .............................. 251/357; 137/329.04; 251/84; 251/319; 251/368
[58] Field of Search ............... 251/356, 357, 324, 368, 251/333, 84–86; 137/329.02, 329.03, 329.04, 375, 468, 334, 340

[56] References Cited

U.S. PATENT DOCUMENTS

| 662,249 | 11/1900 | Cadmar | 137/329.03 |
|---|---|---|---|
| 1,492,199 | 4/1924 | Brosius | 251/368 |
| 1,825,177 | 9/1931 | Brosius | 251/368 |
| 2,195,791 | 4/1940 | Slick | 251/368 |
| 2,599,832 | 6/1952 | Hodge | 251/368 |
| 2,736,935 | 3/1956 | Shea | 251/368 |
| 3,281,904 | 11/1966 | Murton | 251/367 |
| 3,352,533 | 11/1967 | Murton | 251/356 |
| 3,352,534 | 11/1967 | Harley | 251/356 |
| 3,554,490 | 1/1971 | Calhoun, Jr. | 251/356 |

Primary Examiner—A. Michael Chambers
Attorney, Agent, or Firm—Vinson & Elkins

[57] ABSTRACT

A valve for high temperature abrasive service having a body with an inlet connected to a valve chamber and an outlet extending through a valve seat from the valve chamber, a valve stem movable toward and away from the valve seat, a valve member mounted on the valve stem to coact with the valve seat to control flow therethrough, said valve member having an outer sleeve of abrasion resistant material which is supported by annular split springs to prevent rattling of the sleeve and to insulate it from the effects of differential expansion between it and its internal support members. The spring is generally annular in shape with its width extending axially of the sleeve and having sinusoidal waves above and below its circular axis.

14 Claims, 4 Drawing Figures

VALVE

BACKGROUND

In valves, such as variable chokes, for example, which are subject to erosive conditions their orifice and valve members are commonly made of highly abrasion resistant materials, such as cemented carbide or ceramic material. These abrasion resistant materials are weak in tension and shear. These materials are generally recommended for use in structures where they can be used in compression but are not subjected to tension or shear. When used in valves any relative movement between the abrasion resistant material and the other parts of the valve should be avoided to avoid damage to the abrasion resistant parts.

The R. S. Willis U.S. Pat. No. 3,207,181 and the W. J. Baker U.S. Pat. No. 3,426,797 are examples of valves using abrasion resistant materials for valve members and orifice members. The disclosures of both of these patents suggest retaining the abrasion resistant members by press fitting them into a metal carrier. When exposed to high temperatures the difference in the coefficient of thermal expansion of steel (carrier) and the abrasion resistant material will be sufficient to cause a release of the press fit at temperatures substantially above 250° F.

The J. R. Claycomb U.S. Pat. No. 4,190,073 discloses another type of valve in which one of the abrasion resistant members is retained by axially clamping it about close fitting metal members through the use of a metal bolt. At elevated tempertures the expansion of the inside fitting metal members is greater than that of the abrasion resistant member and with the expansion of the tight fitting inside members the abrasion resistant member may split or otherwise rupture or if there is sufficient clearance to avoid this problem the expansion of the bolt allows the abrasion resistant member to vibrate and ultimately shatter as a result of such vibration.

SUMMARY

The present invention provides an improved valve structure which is suitable for use in abrasive conditions at elevated temperatures substantially above 250° F. The improved valve includes a body with an inlet, a valve chamber with a valve seat and an outlet extending from the valve seat, a valve member including a valve stem, a retainer secured to the valve stem, an abrasion resistant sleeve mounted on said retainer to prevent relative axial movement of the sleeve on said retainer and resilient means in the form of a split ring spring positioned around a portion of the retainer and within the sleeve to center the sleeve on the retainer and to insulate the sleeve from forces resulting from the higher coefficient of expansion of the retainer than of the sleeve when subjected to elevated temperatures.

An object of the present invention is to provide an improved valve suitable for use in highly abrasive, high temperature conditions which has an acceptable service life.

Another object is to provide an improved valve with an abrasion resistant valve member which is not placed in tension due to the high temperatures encountered.

A further object is to provide an improved valve for high velocity, high temperature conditions which is not subject to vibration or damage due to differential expansion.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
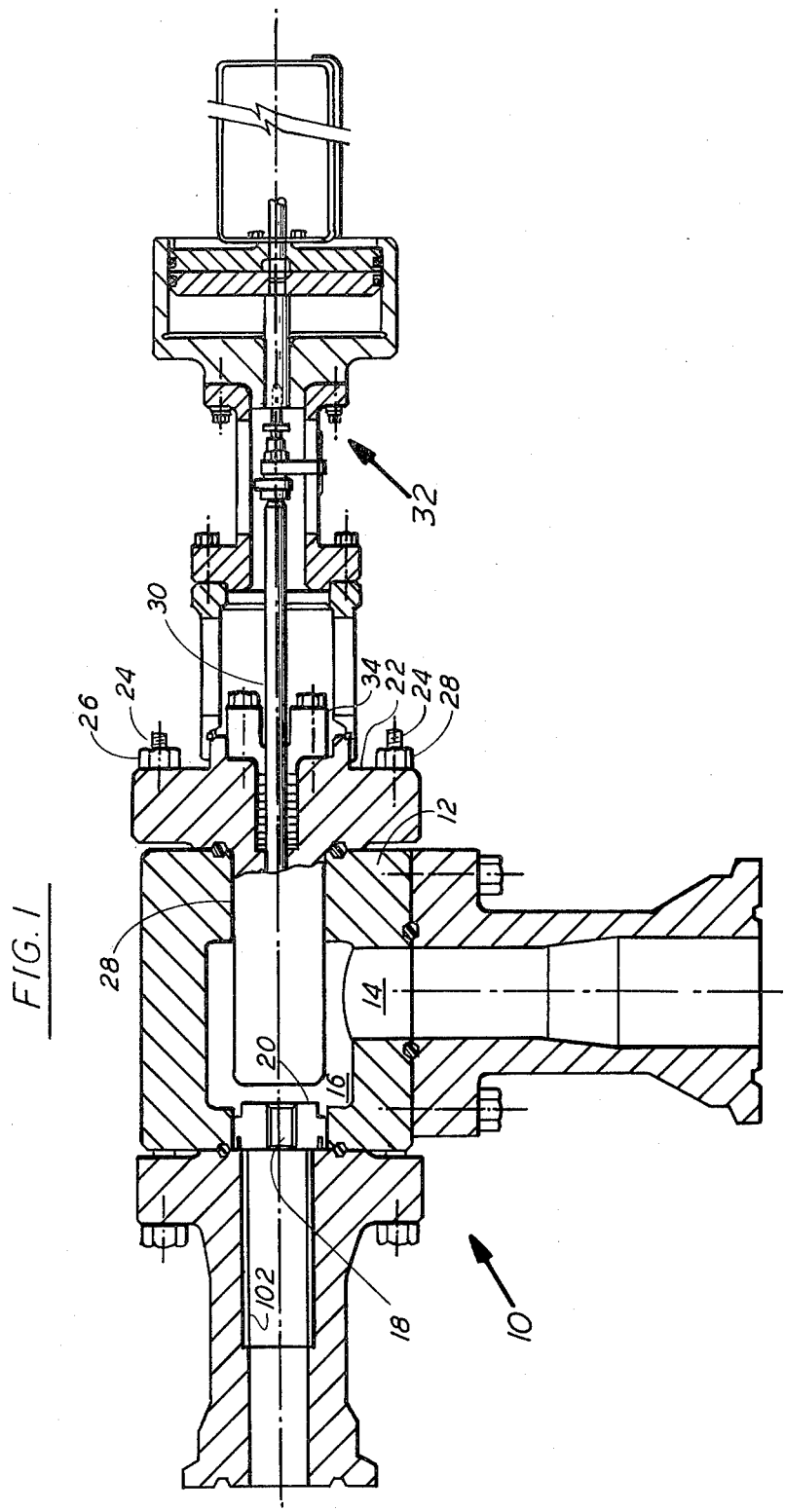
FIG. 1 is a sectional view of the improved valve of the present invention.
Figure 2:
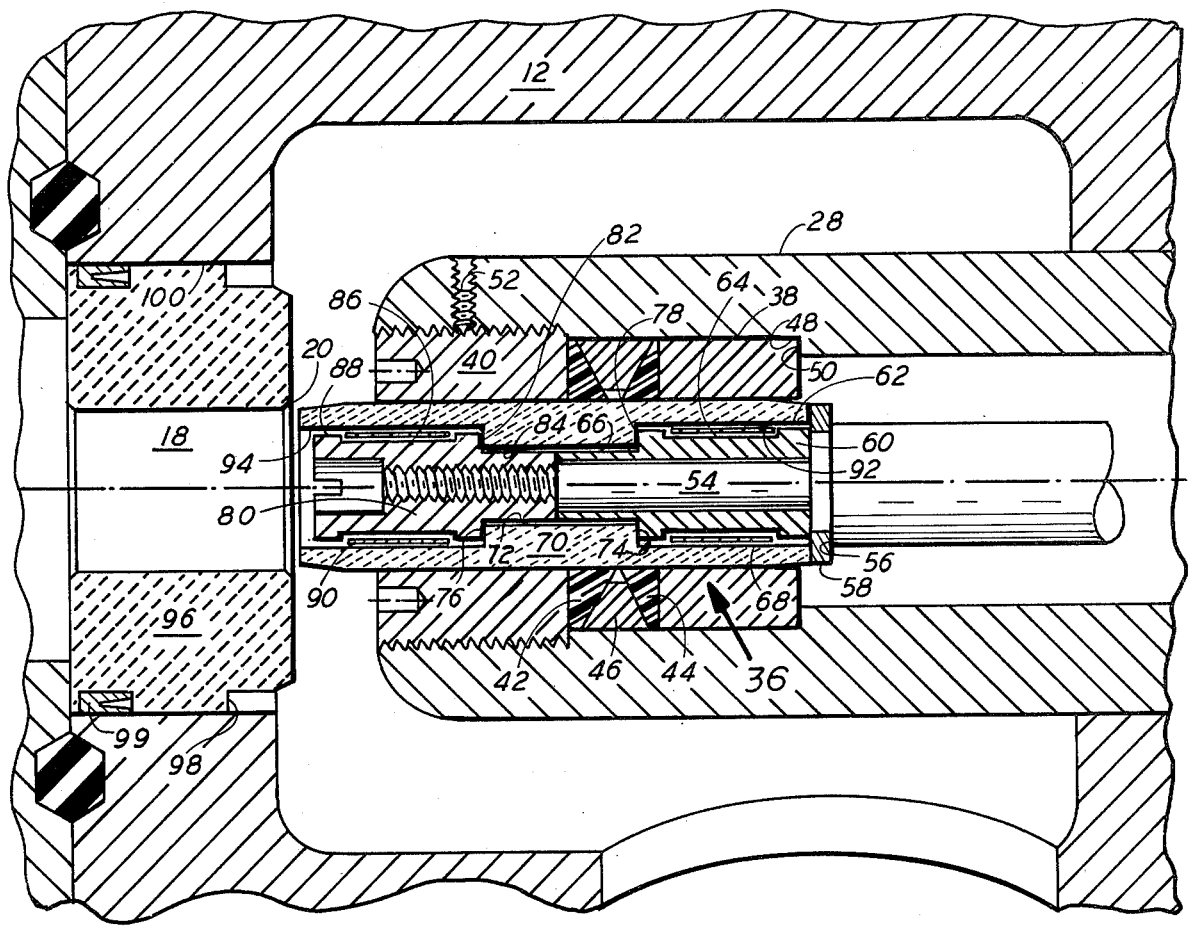
FIG. 2 is an enlarged detail sectional view illustrating the mounting of the abrasion resistant valve member on the valve stem.

Valve 10 shown in FIG. 1 includes valve body 12 which has inlet 14 extending to internal valve chamber 16 and outlet 18 extending from valve chamber 16 through valve seat 20. Bonnet 22 is secured to body 12 by studs 24 and nuts 26 and includes tubular extension 28 positioned with its open end in chamber 16 in spaced relationship to valve seat 20. Valve stem 30 extends through bonnet 28 and is connected to actuator 32 and a seal between bonnet 28 and stem 30 is provided by packing gland 34. As shown in FIG. 2, valve member 36 is secured to the end of valve stem 30 as hereinafter described and is adapted to slide within tubular extension 28 to coact with valve seat 20 to control the flow through valve 10. The exterior of valve member 36 slides within tubular extension 28 supported by metal wear resistant guides 38 and 40 and wipers 42 and 44 which are held against the exterior of valve member 36 by spreader 46. Guide 38 is tubular in shape and is positioned in counter bore 48 in tubular extension 28 against shoulder 50. Wipers 42 and 44 are positioned in counter bore 48 with spreader 46 between them and guide 40 is threaded into counterbore 48 to hold wipers 42 and 44 and guide 38 therein. Guide 40 is locked in its set position by set screw 52.

Valve member 36 is secured to valve stem 30 as best seen in FIG. 2. Valve stem 30 includes shaft 54 extending beyond shoulder 56 and axial spring washer 58 is positioned on shaft 54 against shoulder 56. Insert 60 which is tubular in shape is positioned on shaft 54 against spring 58. Insert 60 has an outer cylindrical surface 62 near spring 58, an intermediate cylindrical surface 64 of smaller diameter than surface 62 and a third cylindrical surface 66 having a smaller diameter than surface 64. Spring 68 is positioned around surface 64 of insert 60. Abrasion resistant sleeve 70 is positioned around insert 60 and spring 68 as shown. The material of sleeve 70 is preferred to be ceramic material or a cemented carbide, such as, tungsten carbide, silicone carbide, or titanium diboride. Sleeve 70 includes an inner land 72 providing shoulders 74 and 76. Sleeve 70 is positioned on insert 60 so that shoulder 74 abuts shoulder 78 on insert 60 between surfaces 64 and 66. Insert 80 is threaded onto the end of shaft 54 with its shoulder 82 engaging shoulder 76 of sleeve 70. Insert 80 includes small diameter surface 84, intermediate surface 86 which is larger than the diameter of surface 84 and shoulder 82 therebetween and outer surface 88 of larger diameter than surface 86. Spring 90 which is preferably the same as spring 68 is positioned around surface 86 of insert 80 and within sleeve 70 as shown. It should be noticed that the inner surface 92 of sleeve 70 is spaced from surface 62 and the inner surface 94 of sleeve 70 is spaced from surface 88 of insert 80. Further sleeve 70 is reversible, that is, it may be removed from inserts 60 and 80 and shaft 54 and installed thereon with its other end abutting spring 58.

Valve seat 20 is provided by insert 96 which is annular in shape, is of an abrasion resistant material, such as cemented carbide, ceramic material or other suitable material as mentioned above, and has an external flange 98. Seal ring 99 is positioned in bore 100 and around the exterior of insert 96 as shown and provides sealing of insert 96 in bore 100 and retains insert 96 therein. Insert 96 also is reversible in that it can be inserted into bore 100 either way. As shown in FIG. 1, outlet 18 includes liner 102 which is of an abrasion resistant material such as tungsten carbide, silicone carbide or other suitable material as mentioned above.

While not shown, the exterior of tubular extension 28 may be provided with a hardfacing a tungsten carbide but in most applications it is not subject to as much extreme wear as the are of flashing of liquid to vapor between sleeve 70 and insert 96.

Figure 3:
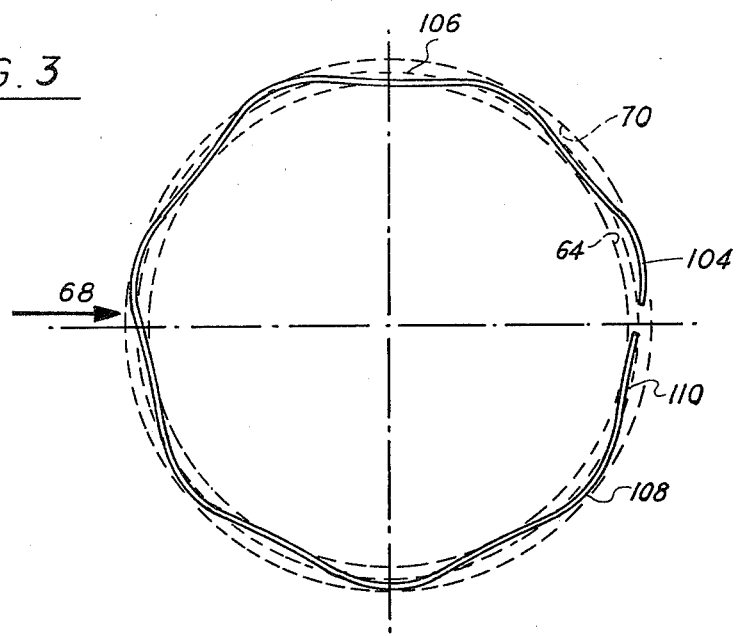
FIG. 3 is an end view of the improved mounting springs used to support the valve member sleeve on the retainer.

As shown in FIG. 3, springs 68 and 90, (spring 68 being shown) which are identical, are in the form of a split ring 104 with the width of spring 18 being in an axial direction. When viewed from the end as in FIG. 3 spring 68 has a sinusoidal shape with respect to its central or median position 106. This median position in a one inch valve has a radius of 0.320 inches. The wave height is 0.059±0.005 inches, the radius of curvature of the crests 108 is 0.09 and the radius of curvature of the troughs 110 is 0.13. The gap between the ends of the spring is 0.35±0.030 inches. The width of the spring is 0.748 inch. The spring 68 is preferred to be made of a corrosion resistant material such as Inconel X 750 of 0.010 inch thickness.

Figure 4:
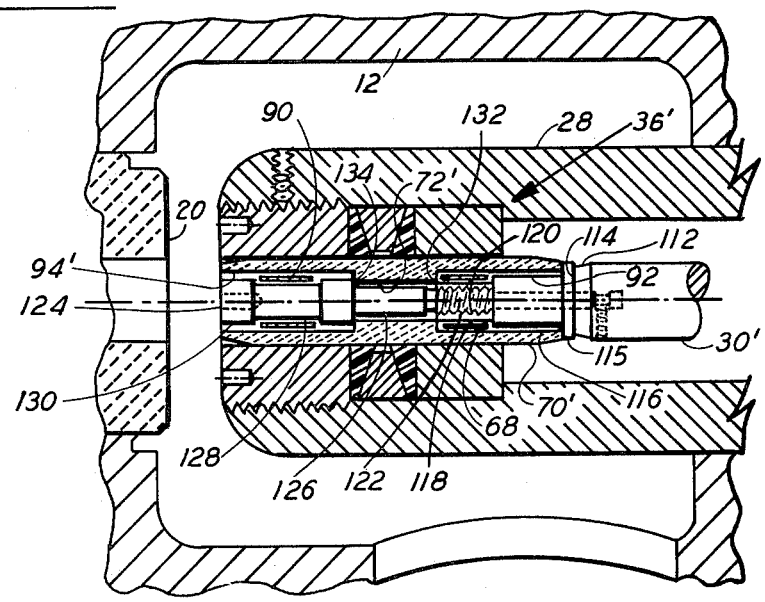
FIG. 4 is an enlarged detail sectional view of a modified form of abrasion resistant valve member.

A modified form of the valve member 36' is shown in FIG. 4. In this form no insert members are provided to retain sleeve 70' in position on valve stem 30'. The outer end of valve stem 30' is provided with reduced diameter surface 112, which forms shoulder 114, against which axial spring washer 115 is positioned and sleeve 70' abuts spring 115 when installed between stem surface 116 and outer reduced diameter stem surface 118 on which spring 68' is installed. The outer end of valve stem 30' is bored and threaded at 120 to receive the threaded ene 122 of stud 124. Stud 124 has a small diameter surface 126, an intermediate larger diameter surface 128 and an outer large diameter surface 130. The land 72' of sleeve 70' is engaged by shoulder 132 on stem 30' and by shoulder 134 on stud 124. Spring 90' is installed on surface 128. Surface 130 is spaced inwardly a short distance from surface 94' of sleeve 70' and surface 116 on stem 30' is also spaced inwardly from surface 92' on sleeve 70'. Surface 126 is spaced slightly from land 72' of sleeve 70'.

From the foregoing it may be seen that the present invention provides an improved valve member which is suitable for use in highly abrasive and high temperature applications since the abrasion resistant sleeve of the valve member is supported on the valve stem in a manner assuring that it does not rattle or vibrate even at cold temperatures and also it is insulated from the inner supports which expand more rapidly responsive to increases in temperature because such supports have much higher coefficients of thermal expansion than the abrasion resistant sleeve. The engagement of the abrasion resistant sleeve between shoulders on its land and the internal centering support provided by the split springs assure that the valve member is not subjected to vibration and is not stressed in tension because of the higher rate of expansion of its support members due to temperature increases.

As used herein, the term "valve member" is intended to mean the movable portion of the valve which coacts with the seat to control or shut off flow through the valve.

What is claimed is:

1. A valve for high temperature abrasive service comprising
    a valve body having an inlet, an outlet and a valve chamber therebetween with a valve seat in said chamber around said outlet,
    a metal valve stem movable toward an away from said valve seat,
    a valve member mounted on said valve stem and adapted with the movement of said valve stem to control flow through said valve seat,
    said valve member having a sleeve of abrasion resistant material surrounding said metal valve stem, and
    means to securely attach said sleeve to said metal valve stem and including resilient means between said metal stem and said sleeve to center said sleeve on said stem and to insulate said sleeve from tension loading resulting from differential expansion when exposed to elevated temperature.

2. A valve according to claim 1 wherein said attaching and insulating means includes,
    at least one spring between said stem and said sleeve.

3. A valve according to claim 2 wherein
    said spring is a split ring and has its width extending axially of said sleeve.

4. A valve according to claim 2 wherein said spring has a sinusoidal shape in section taken transversely to its circular axis.

5. A valve according to claim 1 wherein said sleeve is tubular in shape and has an internal land with annular shoulders on each end of said land, and
    said attaching means includes means for clamping said sleeve to said stem by engaging said shoulders on said land.

6. A valve according to claim 5 wherein said clamping means includes
    a first insert positioned within one end of said sleeve and having a shoulder engaging one of said land shoulders,
    a second insert positioned within the other end of said sleeve and having a shoulder engaging the outer land shoulder of said sleeve,
    the exterior of each of said inserts being spaced from the inner surfaces of said land and said sleeve at each side of said land, and
    means for securing said inserts on said stem in engagement with said sleeve shoulders.

7. A valve according to claim 6 wherein said insulating means includes
    a pair of split springs,
    one of said springs being positioned around each of said inserts to center said sleeve on said inserts.

8. A valve for high temperature abrasive service comprising
    a valve body having an inlet, an outlet and a valve chamber therebetween with a valve seat in said chamber around said outlet, a valve member movable within said valve chamber toward and away from said valve seat to control flow through said valve seat, said valve member being mounted on a shaft and including a tubular sleeve of abrasion resistant material and having an internal land with shoulders facing each end of said sleeve, means on said shaft engaging said land shoulders to clamp said sleeve against axial movement on said shaft, and a pair of annular split springs mounted around said shaft with one of said springs being positioned within said sleeve on one side of said land and the other of said springs being positioned within said sleeve on the other side of said land, both of said springs engaging the interior of said sleeve to center it around said shaft.

9. A valve according to claim 8 wherein said clamping means includes a shoulder on said shaft, and a stud threaded to the outer end of said shaft and having a shoulder facing said shaft whereby said land is clamped between the two shoulders.

10. A valve according to claim 8 wherein said clamping means includes a first insert surrounding said shaft and having an outwardly facing shoulder to engage the inwardly facing land shoulder of said sleeve, and a second insert threaded to said shaft and having an inwardly facing shoulder to engage the outwardly facing land shoulder of said sleeve.

11. A valve according to claim 8 wherein the material of said sleeve is selected from the group consisting of tungsten carbide, silicone carbide and titanium diboride.

12. A valve according to claim 8 wherein the material of said sleeve is a ceramic material.

13. A valve for high temperature abrasive service comprising a valve body having an inlet, an outlet, and a valve chamber therebetween with a valve seat in said chamber around said outlet, a valve stem movable toward and away from said valve seat, a valve member of abrasion resistant material, means for securely attaching said valve member to said valve stem, and resilient means positioned between said valve member and said stem to center said valve member with respect to said valve stem and to insulate said valve member from vibration damage caused by a loosening of the valve member responsive to differential expansion when the stem and valve member are exposed to temperature extremes.

14. In a valve for high temperature abrasive service having a valve body having an inlet, an outlet and a valve chamber therebetween with a valve seat in said chamber around said outlet, a metal valve stem movable toward and away from said valve seat, a valve member mounted on said valve stem and adapted with the movement of said valve stem to control flow through said valve seat, said valve member having a sleeve of abrasion resistant material surrounding the inner end of said metal valve stem, the improvement consisting of means to securely attach said sleeve to said metal valve stem and including resilient means between said stem and said sleeve to center said sleeve on said stem and to insulate said sleeve from tension loading resulting from differential expansion when exposed to elevated temperature.

* * * * *